US012142858B2

(12) United States Patent
Schuman

(10) Patent No.: US 12,142,858 B2
(45) Date of Patent: Nov. 12, 2024

(54) FOLDED MONOPOLE ANTENNA FOR USE WITHIN AN ARRAY

(71) Applicant: SRC, Inc., North Syracuse, NY (US)

(72) Inventor: Harvey K. Schuman, Fayetteville, NY (US)

(73) Assignee: SRC, Inc., North Syracuse, NY (US)

(*) Notice: Subject to any disclaimer, the term of this patent is extended or adjusted under 35 U.S.C. 154(b) by 420 days.

(21) Appl. No.: 17/390,125

(22) Filed: Jul. 30, 2021

(65) Prior Publication Data

US 2023/0036345 A1 Feb. 2, 2023

(51) Int. Cl.
*H01Q 9/42* (2006.01)
*H01Q 1/48* (2006.01)
*H01Q 9/16* (2006.01)
*H01Q 21/06* (2006.01)

(52) U.S. Cl.
CPC ................. *H01Q 9/42* (2013.01); *H01Q 1/48* (2013.01); *H01Q 9/16* (2013.01); *H01Q 21/06* (2013.01)

(58) Field of Classification Search
CPC .......... H01Q 21/10; H01Q 21/12; H01Q 9/42; H01Q 21/06; H01Q 21/08
See application file for complete search history.

(56) References Cited

U.S. PATENT DOCUMENTS 3,449,751 A * 6/1969 Schroeder .............. H01Q 21/29 343/848
4,937,588 A * 6/1990 Austin ..................... H01Q 9/32 343/792
4,963,879 A * 10/1990 Lin ........................ H01Q 21/10 343/792
5,798,736 A * 8/1998 Hall ....................... H01Q 5/357 343/791
6,057,804 A * 5/2000 Kaegebein ............... H01Q 9/32 343/792
6,947,006 B2 * 9/2005 Diximus ................ H01Q 21/10 343/792
7,180,460 B1 * 2/2007 Bogdans .................. H01Q 9/18 343/792
7,289,080 B1 * 10/2007 Bohlman ............... H01Q 1/246 343/793
8,368,602 B2 * 2/2013 Hill ........................ H01Q 9/285 343/702

(Continued)

FOREIGN PATENT DOCUMENTS

EP 1569297 A1 * 8/2005 ............. H01Q 21/10
EP 1826868 A2 * 8/2007 ............. H01Q 21/28

(Continued)

*Primary Examiner* — Ricardo I Magallanes
(74) *Attorney, Agent, or Firm* — Jonathan Gray; George R. McGuire; Bond, Schoeneck & King PLLC

(57) ABSTRACT

An antenna array includes a first ground plane; a second ground plane disposed below the first ground plane; a folded monopole antenna disposed between the first ground plane and the second ground plane, the folded monopole antenna comprising a driven arm, a parasitic arm, and a short connecting the driven arm to the parasitic arm; an antenna disposed above the first ground plane; and a feedline in electrical communication with the antenna such that an electrical signal input to the feedline drives the antenna, wherein the feedline extends through a cavity formed within the parasitic arm of the folded monopole antenna.

9 Claims, 10 Drawing Sheets

(56) References Cited

U.S. PATENT DOCUMENTS

| | | | | |
|---|---|---|---|---|
| 8,665,173 | B2 * | 3/2014 | Livingston | H01Q 19/108 343/872 |
| 9,419,332 | B2 * | 8/2016 | Nilsson | H01Q 9/28 |
| 11,043,739 | B2 * | 6/2021 | Palud | H01Q 9/18 |
| 2003/0227419 | A1 * | 12/2003 | Hung | H01Q 5/321 343/715 |
| 2007/0040758 | A1 * | 2/2007 | Dwyer | H01Q 21/062 343/792 |
| 2013/0106667 | A1 * | 5/2013 | Fenn | H01Q 1/525 343/866 |
| 2023/0163480 | A1 * | 5/2023 | Park | H01Q 21/28 343/893 |

FOREIGN PATENT DOCUMENTS

| | | | | |
|---|---|---|---|---|
| EP | 2557631 | A1 * | 2/2013 | H01Q 1/40 |
| JP | 3623825 | B2 * | 2/2005 | |
| WO | WO-2022263657 | A2 * | 12/2022 | |

* cited by examiner

FOLDED MONOPOLE ANTENNA FOR USE WITHIN AN ARRAY

FIELD OF INVENTION

This disclosure relates, generally, to folded monopole antennas, and, in particular, to folded monopole antennas having a cavity for receiving a feedline, for use within an array.

BACKGROUND

Vertically stacked multiband antennas have been considered as parts of a wide band, broad beam direction finding system. Such vertically stacked antennas feature multiple antenna elements arranged in a stacked configuration with respect to the ground or floor. However, feed cables that supply an electrical drive signal to the upper antennas hang down across the lower antennas, scattering fields incident on lower antennas and potentially distorting direction-finding accuracy. Accordingly, there exists a need in the art for managing the feed cables to the upper antennas in a manner that prevents the lower cables from scattering fields incident on lower antennas.

SUMMARY

All examples and features mentioned below can be combined in any technically possible way.

According to an aspect, an antenna array includes: a first ground plane; a second ground plane disposed below the first ground plane; a folded monopole antenna disposed between the first ground plane and the second ground plane, the folded monopole antenna comprising a driven arm, a parasitic arm, and a short connecting the driven arm to the parasitic arm; an antenna disposed above the first ground plane; and a feedline in electrical communication with the antenna such that an electrical signal input to the feedline drives the antenna, wherein the feedline extends through a cavity formed within the parasitic arm of the folded monopole antenna.

In an example, the antenna is a second folded monopole antenna comprising a second driven arm, a second parasitic arm, and a second short connecting the second driven arm to the second parasitic arm In an example, the antenna is a dipole.

In an example, the short is conductively attached to the first ground plane.

In an example, the short is separated from the first ground plane by a distance.

In an example, the feedline enters the parasitic arm through an aperture in the parasitic arm of the folded monopole antenna, wherein the aperture is at least partly filled with a conductive material.

In an example, the conductive material is a conductive putty.

In an example, the feedline is a coaxial cable.

In an example, the driven arm is tapered at a receiving end, the receiving end receiving a second feedline.

In an example, the antenna array further includes a third ground plane disposed below the second ground plane; a second folded monopole antenna disposed between the second ground plane and the third ground plane, the second folded monopole antenna comprising a second driven arm, a second parasitic arm, and a second short connecting the second driven arm to the second parasitic arm; a second feedline in electrical communication with the folded monopole antenna such that a second electrical signal input to the second feedline drives the folded monopole antenna, wherein the second feedline extends through a second cavity formed within the second parasitic arm of the second folded monopole antenna.

In an example, the feedline further extends through the second cavity.

In an example, the driven arm is tapered at a receiving end, the receiving end receiving the second feedline.

In an example, the second driven arm is tapered at a receiving end, the receiving end receiving a third feedline.

According to another aspect, folded monopole antenna, comprising: a driven arm; a parasitic arm; a short connecting the driven arm to the parasitic arm, wherein the parasitic arm defines a cavity, dimensioned to receive a feedline for an antenna, wherein the cavity extends between a first aperture and a second aperture in the parasitic arm.

In an example, the first aperture is at least partially filled with a conductive material.

In an example, the conductive material is a conductive putty.

In an example, the short is conductively attached to an upper ground plane.

In an example, a feedline is fed through the cavity, entering the cavity at the first aperture and exiting the cavity at the second aperture.

In an example, the driven arm is tapered at a receiving end, the receiving end configured to receive a feedline for driving the folded monopole antenna.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Various examples described in this disclosure relate to an antenna array having at least one folded monopole antenna, the parasitic arm of which defines a cavity for receiving a feedline in electrical communication with a separate antenna of the array. In various examples, multiple folded monopoles can be arranged into a stacked array, the feedlines being fed through the parasitic arms of the folded array antennas to prevent the feedlines from scattering fields incident to the lower antennas.

Figure 1:
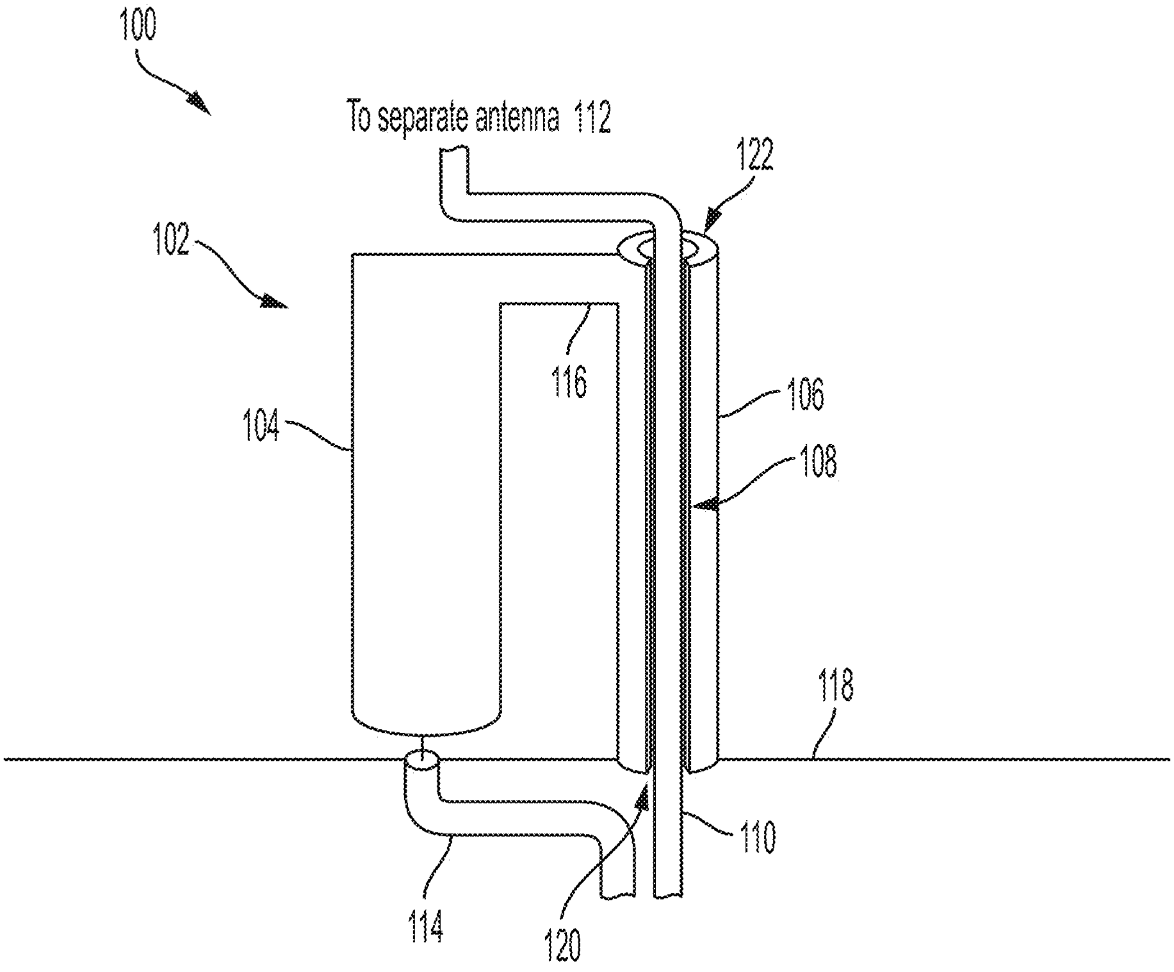
FIG. 1 depicts a perspective view of an antenna array including a folded monopole antenna, according to an example.

FIG. 1 depicts a partial cross-section view of a portion of an antenna array 100 including a plurality of antennas, one of which is folded monopole antenna 102. Folded monopole antenna 102 includes a driven arm 104 and a parasitic arm 106, the parasitic arm 106 defining a cavity 108 therewithin, through which a feedline 110 for a separate antenna of array 100 is fed. In an example, the separate antenna is disposed above folded monopole antenna 102 with respect to the ground (i.e., the physical ground) or the floor, the cavity 108 thus functioning to conceal feedline 110, preventing it from hanging in front of and scattering fields incident on folded monopole antenna 102.

A folded monopole antenna arrangement is generally known in the art; however, a short description is provided here for completeness. Generally, a folded monopole comprises a driven arm 104, which receives a drive signal from a feedline 114 (also referred as a feed cable) in electrical communication with driven arm 104. Driven arm 104 is connected to parasitic arm 106 by a short 116. In operation, the driven arm 104 receives an electrical drive signal (also referred to as an excitation voltage) from feedline 114, creating two operating modes: (1) a radiating mode and (2) a transmission line mode. In the radiating mode, the current on the driven arm 104 and that on the parasitic arm 106 are can be viewed as excited by the same equivalent voltage source and is also referred to as "common mode" or "symmetric mode." This mode radiates a time-varying electrical field in the manner of a standard monopole and is characterized by zero net current at the upper end. The drive signal excites the common mode as well as a transmission line mode (or "asymmetric mode") characterized by equal and opposite currents on the driven and parasitic arms. At the self-resonant frequency whereby the monopole length is quarter wave, the modes combine to increase the folded monopole impedance bandwidth with respect to that of the standard monopole. In typical examples, the folded monopole bandwidth is roughly 20 percent, or about twice that of the standard monopole.

Folded monopole antenna 102 is disposed above ground plane 118. Ground plane 118 is shown as a plane that extends into the page so that the inventive features of folded monopole antenna 102 are more clearly seen. It should be understood, however, that ground plane 118 can be implemented as any suitable ground plane known in the art, such as a finite circular ground plane. Further, despite its simplified representation, ground plane 118 should be understood to be tilted in the page, commensurate with the orientation of folded monopole 102.

Figure 2:
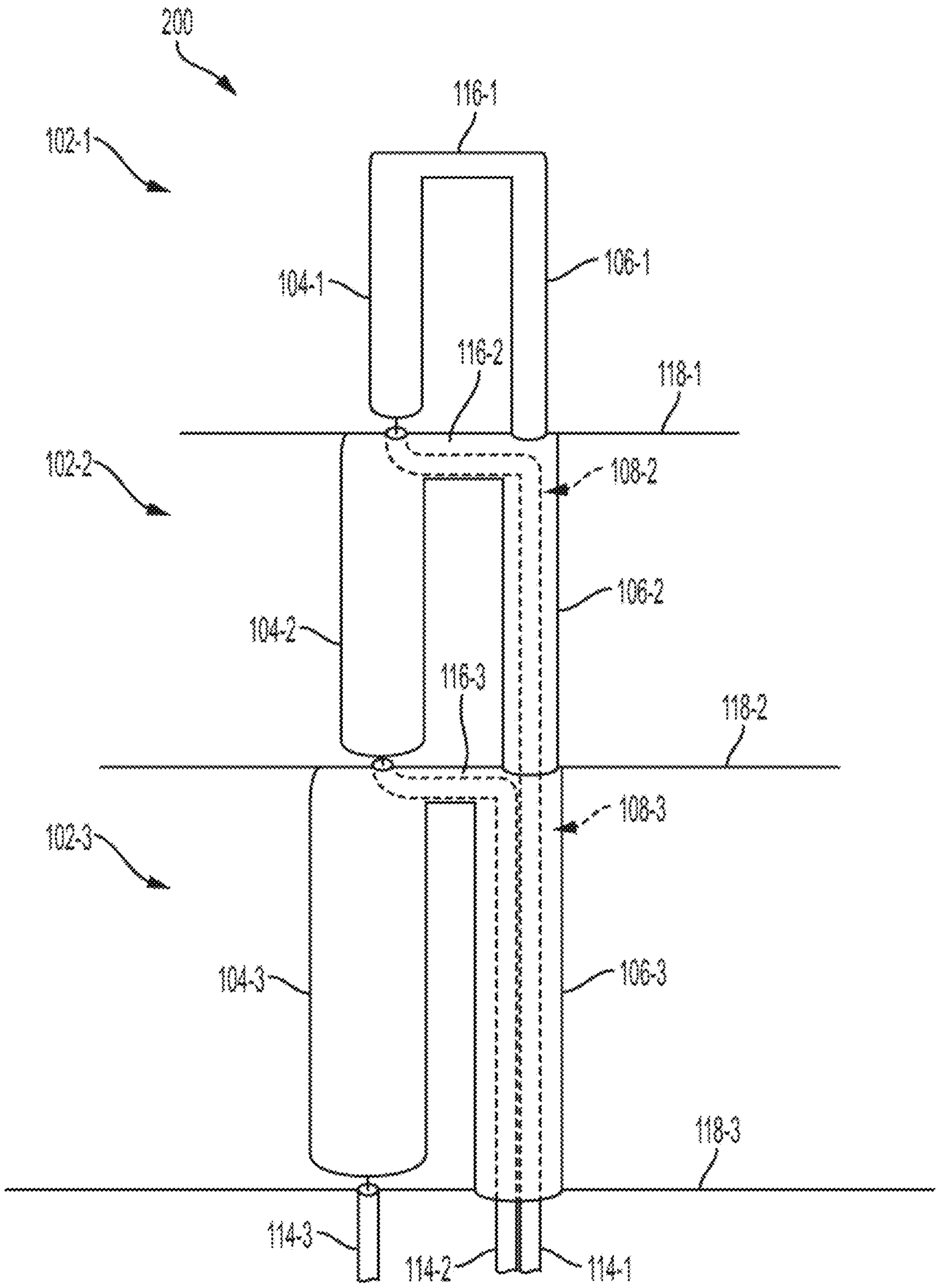
FIG. 2 depicts a perspective view of antenna array including multiple folded monopole antennas, according to an example.
Figure 3:
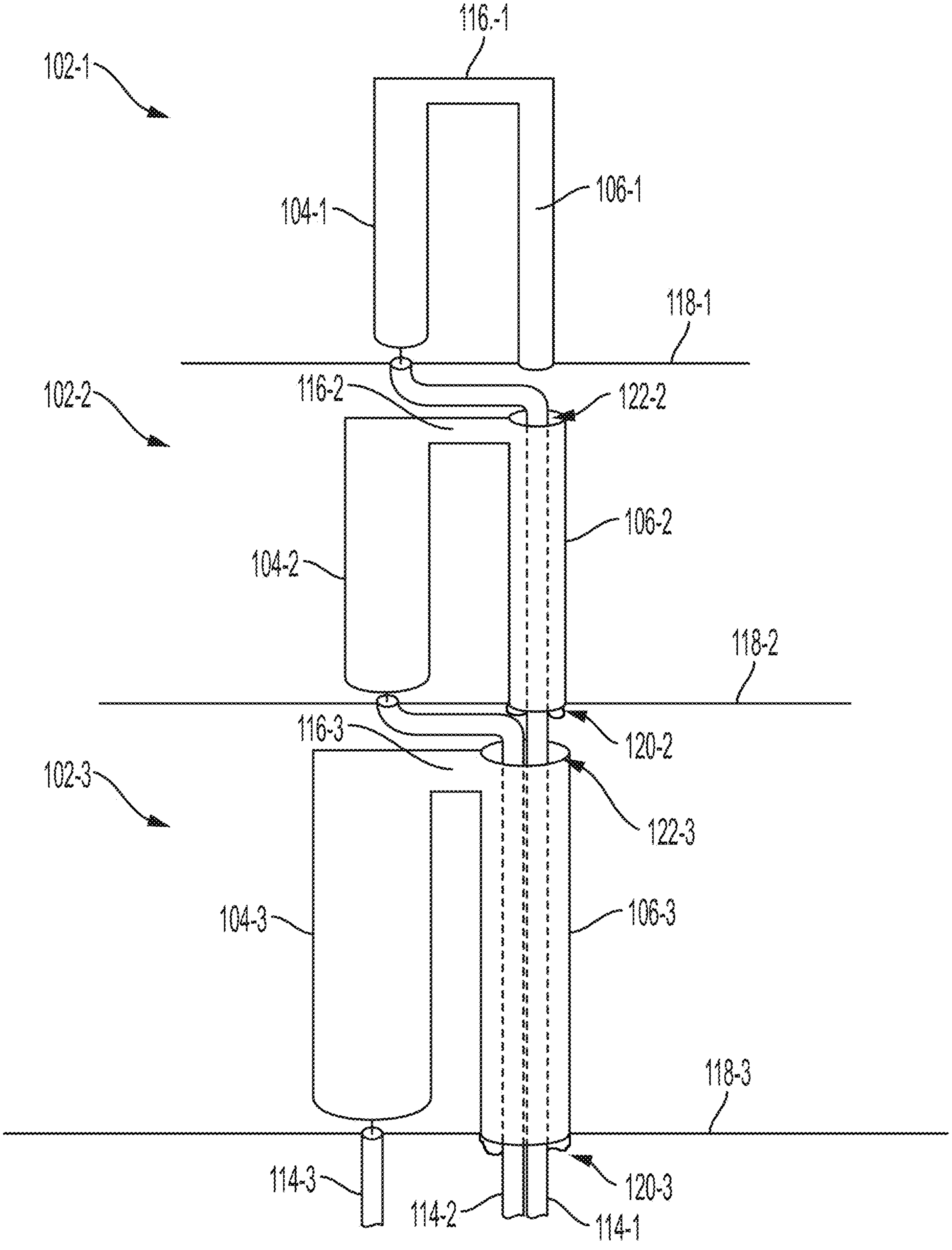
FIG. 3 depicts a perspective view of antenna array including multiple folded monopole antennas, according to an example.

As mentioned above, parasitic arm 106 defines an internal cavity 108, through which feedline 110 is fed. Feedline 110, which may, for example, be a shielded coaxial cable, is in electrical communication with and provides a drive signal to at least one separate antenna of the array (although any suitable kind of feedline that connects to an antenna through a ground plane can be used). Folded monopole antenna 102 can be used in conjunction with and form an array with any kind of antenna receiving a drive signal from a feedline, including a monopole antenna, a folded monopole antenna (e.g., such as in an array as depicted in FIGS. 2 and 3), a dipole antenna, a folded dipole antenna, etc.

More particularly, parasitic arm 106 of folded monopole antenna 102 has a first aperture 120, located at the bottom of parasitic arm 106, at which feedline 110 is inserted, and a second aperture 122, located at the top of parasitic arm 106, from which feedline exits to be coupled to antenna 112. Cavity 108, as depicted in FIG. 1, thus extends along a longitudinal axis of parasitic arm 106 and at least between the first aperture 120 and second aperture 122, such that feedline 110 can enter at first aperture 120 and exit second aperture 122 to be attached to another antenna of array. Precautions are necessary to ensure that the radiating and transmission line modes are properly generated. Two variants are discussed below with reference to FIG. 2 and FIG. 3.

By retaining the feedline 110 for at least one other antenna of array 100 within the parasitic arm 106, feedline 110 is held in a position that avoids scattering fields incident on folded monopole antenna 102 or other antennas within the array, thus improving the performance of the stacked antenna array of FIG. 1.

In alternative examples, first aperture 120 can be located elsewhere (besides the bottom) in parasitic arm 106 of folded monopole antenna 102, and second aperture 122 can be located elsewhere (besides the top) in parasitic arm 106 of folded monopole antenna 102. For example, one or both apertures can be located in the curved sidewall of parasitic arm 106. However, the locations shown in FIG. 1—i.e., the bottom and top, respectively—offer good performance because the largest amount of the feedline is maintained within the parasitic arm.

In the depiction of FIG. 1, parasitic arm 106 is wider than the driven arm 104. The result is that folded monopole antenna 102 impedance is larger than it would be if the arms were of equal diameter. The advantage of this increased width is that it allows more room for feedline 110. If the parasitic arm 106 was thinner than that of the driven arm, the impedance would be less than that if the arms were of equal widths. The advantage of the reduced impedance is simpler match to 50 Ohms. In an example, equal-arm-width folded dipole impedance is roughly 200 Ohms (impedance transformation ratio of 4), the equal-arm-width folded monopole impedance is half that or roughly 100 Ohms. In various examples, the diameter of driven arm 104 can be increased with respect to parasitic arm 106 to arrive at a desired impedance transformation ratio.

It should be understood that the shape and dimensions of folded monopole antenna 102 can vary in various examples. For example, the width of parasitic arm 106 will depend, at least in part, upon the number of feedlines that are fed through it and, as described above, the width of driven arm 104 can depend on the desired impedance transformation ratio of the antenna. In a typical configuration, the stacked antennas are chosen such that the resonant frequency decreases from top to bottom. This ensures that the lower frequency antennas, which will need to funnel larger numbers of feedlines, will contain the larger diameter monopole arms.

FIG. 2 depicts an example of a stacked antenna array 200 featuring multiple folded monopole antennas with feedlines running through the parasitic arms. In this example, three folded monopole antennas are shown arranged in a stack: folded monopole antenna 102-1, folded monopole antenna 102-2, and folded monopole antenna 102-3. Each folded monopole antenna 102-1, 102-2, 102-3 follows the same general features of folded monopole 102, described in connection with FIG. 1, and thus includes a parasitic arm 106 defining a cavity 108 within for receiving a feedline for another antenna of the array.

As shown, folded monopole antenna 102-1, being arranged at the top of the stack, receives a drive signal from feedline 114-1, and is driven relative to ground plane 118-1. Folded monopole antenna 102-2, arranged below ground plane 118-1, receives a drive signal from feedline 114-2, and is driven relative to ground plane 118-2. Folded monopole antenna 102-2 is thus disposed between ground plane 118-1 and ground plane 118-2. Parasitic arm 106-2 of folded monopole antenna 102-2 defines a cavity through which feedline 114-1 is fed. Folded monopole antenna 102-3 is arranged below ground plane 118-2 and receives a drive signal from feedline 114-3 and is driven relative to ground plane 118-3. Because folded monopole antenna 102-3 is positioned below both folded monopole antenna 102-2 and folded monopole antenna 102-1, both feedlines 114-2 and 114-1 are fed through the cavity of parasitic arm 106. Folded monopole 104-1 does not necessarily include a cavity through parasitic arm 106-1 since there are no additional antennas positioned above. Indeed, in various alternative examples, the position of folded monopole 104-1 can be occupied by a different antenna topology (e.g., monopole, dipole, folded dipole, etc.).

In this example, the diameters of the parasitic arms 106-2, 106-3 are dimensioned to receive the requisite number of feedlines. Thus, the diameter of parasitic arm 106 is larger than the diameter of parasitic arm 106. In an alternative example, the diameters of each of the parasitic 106-1, 106-2, 106-3 arms are the same throughout the stacked array. Such an example is permissible as long as the diameter of each parasitic arm is large enough to accommodate the number of feedlines fed through the lowest folded monopole antenna. As described in connection with FIG. 1, the diameter of driven arms 104-2, 104-3, can be dimensioned to account for the increased width of parasitic arms 106-2, 106-3, respectively, to achieve the desired transformation ratio.

In the example of FIG. 2, the tops of folded monopole antenna 102-2 and folded monopole antenna 102-3 are in electrical contact with ground planes 118-1 and 118-2, respectively. The advantage of this design is the total removal of any feedline exposure. However, the disadvantage of this design is that the tops of folded monopole antenna 102-2, 102-3 are conductively attached to respective upper ground planes. The resonance frequency of the folded monopole common mode then may not equal that of its differential mode (also referred to as "the transmission line mode"), reducing the bandwidth superiority of the folded monopole with respect to that of the standard monopole. This deficiency can be corrected by choosing the radius of the upper ground plane of a folded monopole to be a multiple number of half wavelengths at the resonant frequency of that folded monopole. This will result in a high impedance at the attachment of the folded monopole to its upper ground plane thus preserving the quarter wave radiating mode. FIG. 3 below presents an alternative configuration that retains the high impedance while also freeing the upper ground plane size to best accommodate the needs of the upper antenna.

FIG. 3 depicts a variant whereby the tops of the lower monopoles are disconnected from the respective upper ground planes, the feedlines 114-2 and 114-1 thus extending across gaps formed between the top of folded monopole antennas 102-3, 102-2 and the respective ground plane 118-2, 118-1. The advantage of this configuration is that the common mode current (radiating current on both the driven and parasitic arms) diminishes at the top of the folded monopole 102-2, 102-3 because of the open circuit between short 116-2 and ground plane 118-2 and between short 116-3 and ground plane 118-3, as required for conventional operation of the folded monopole. One disadvantage of this variant is allowance of some exposure of the antenna feedlines 114-1, 114-2 but this exposure is expected to only minimally impact antenna performance. Another disadvantage is that the opening of upper aperture 122 may diminish the aforementioned open circuit with respect to the upper ground plane 118. To suppress the associated scattering current at this entry point, it is useful to turn the interior of each parasitic arm 106-2, 106-3 into a shorted quarter wave transmission line. To accomplish this, the bottom of each parasitic arm 106-2, 106-3, where it is attached to ground plane 118, is arranged to create as much of a short circuit as possible. This can be accomplished, for example, by punching cable via holes in ground plane 118-2, 118-3 that are tightly fitted to the cables passing through. Alternatively, or additionally, a conductive material such as a conductive putty can be added to each aperture 120-2 and 120-3. Second, ensure a shorted quarter-wave transmission line is created within parasitic arm 1-6-2, cables 114-1, 114-2 are prevented from touching the interior side walls of the cavity. This can be accomplished, for example, via judicious use of dielectric coating of the cables or placement of dielectric fill within the cavity. This will ensure a transmission line mode of propagation within the cavity. With these measures, with parasitic arm 106 dimensioned to be a quarter wavelength of the drive signal, the short circuit will be a quarter wavelength from the upper end of the parasitic arm creating the requisite high impedance at the upper entry to the 106 cavity.

While an example of three folded monopole antennas is shown in FIGS. 2 and 3, it should be understood that any number of folded monopole antennas can be used as desired, each parasitic arm being dimensioned to receive at least a subset of the feedlines for the upper antennas of the array. Further, it should be understood that the array can include various types of antennas elements, as desired, one of which can be a folded monopole antenna 104 having a parasitic arm 106 with a cavity for receiving feedlines of other elements within the array. Further, in alternative examples, the folded monopole antenna 102 can be used in antenna arrays besides stacked antenna arrays. For example, folded monopole antenna 102 can be used in any type of array in which it is beneficial to mitigate the scattering of feedlines to other antennas within the array.

Figure 4:
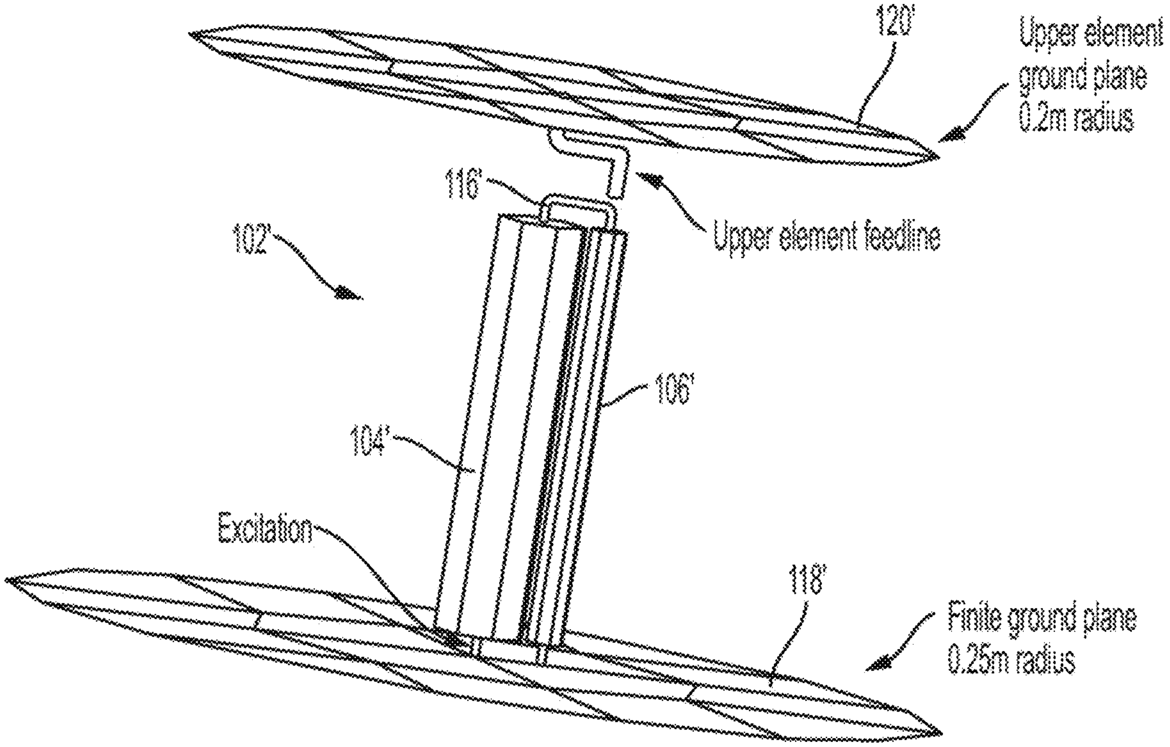
FIG. 4 depicts a perspective view of a simulation of a folded monopole antenna, according to an example.
Figure 5A:
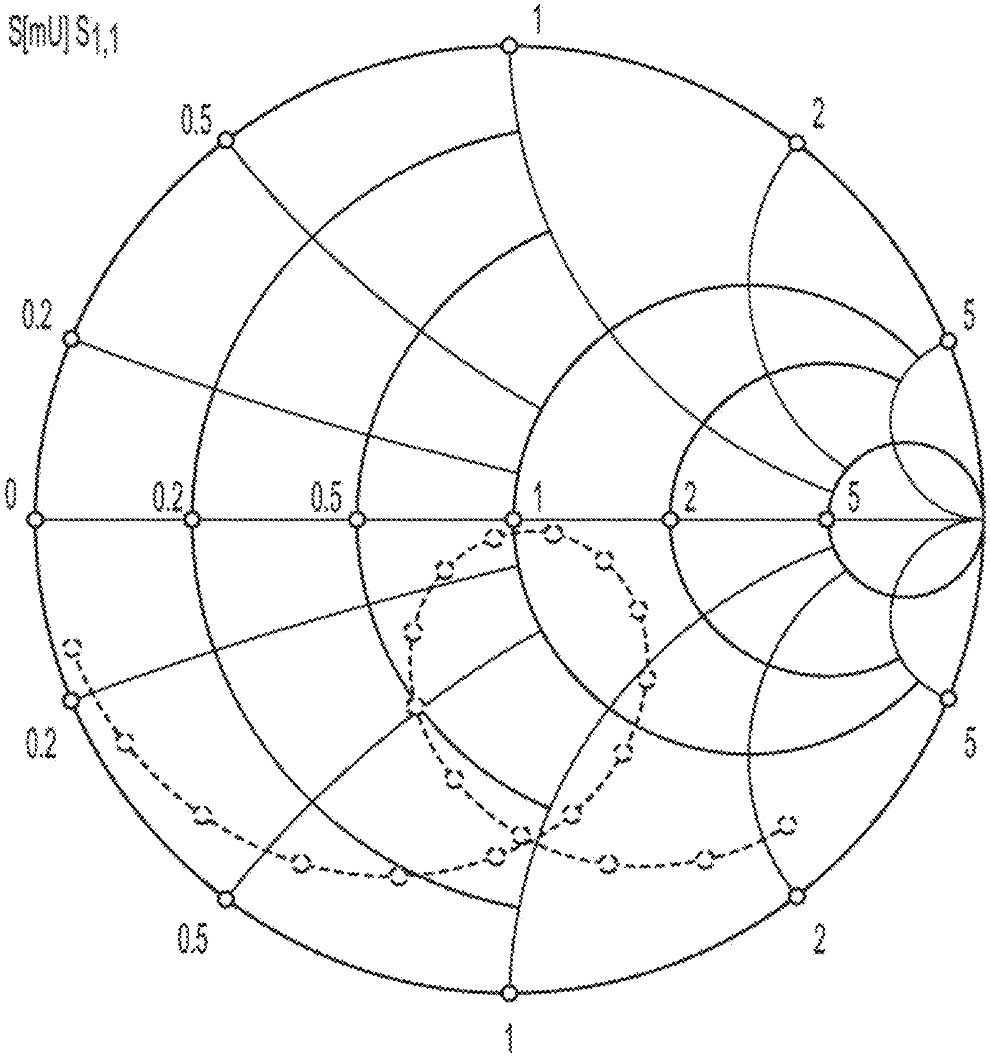
FIG. 5A depicts a 50 Ohm normalized Smith Chart of the return loss of the simulated folded monopole antenna, according to an example.
Figure 5B:
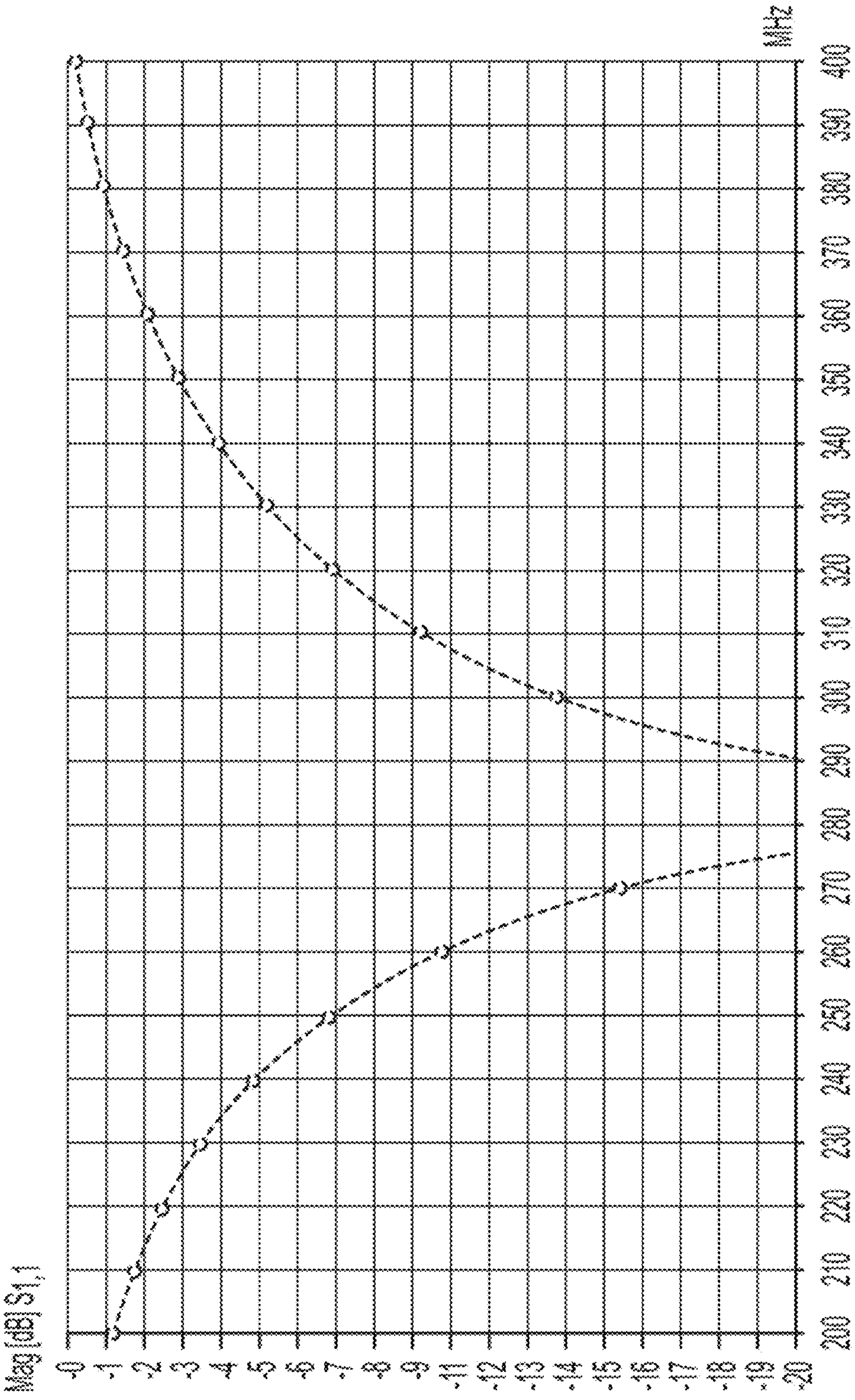
FIG. 5B depicts a plot showing return loss of the simulated monopole antenna across frequency, according to an example.
Figure 6A:
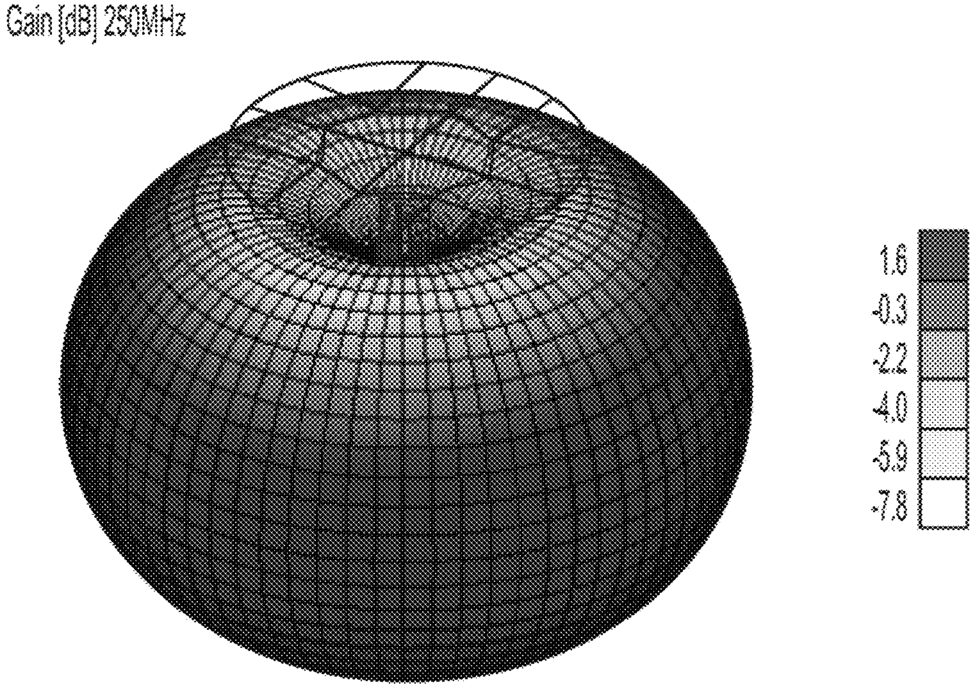
FIG. 6A depicts the gain pattern in dBi of the simulated folded monopole at 250 MHz, according to an example.
Figure 6B:
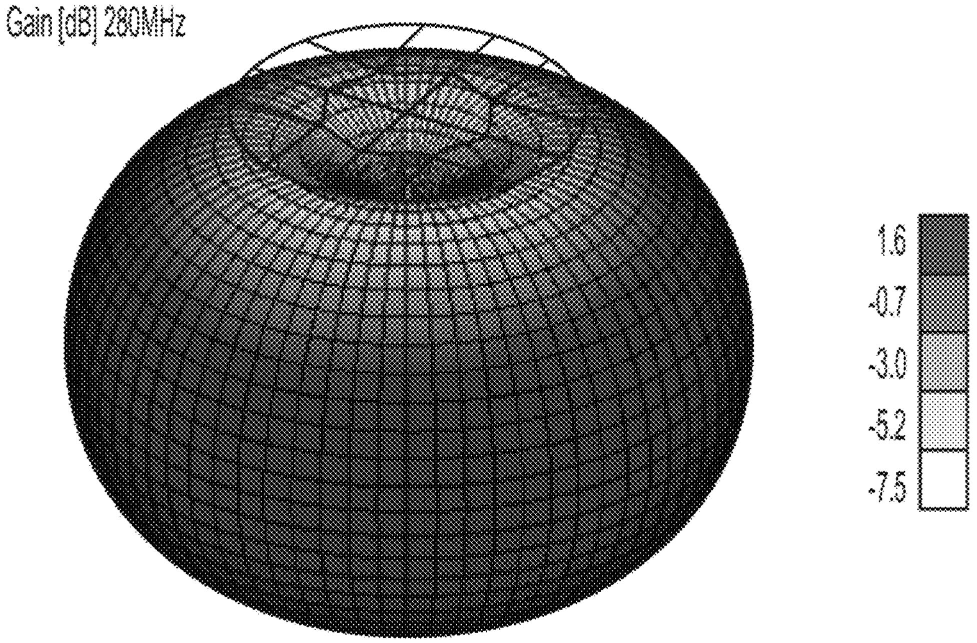
FIG. 6B depicts the gain pattern in dBi of the simulated folded monopole at 280 MHz, according to an example.
Figure 6C:
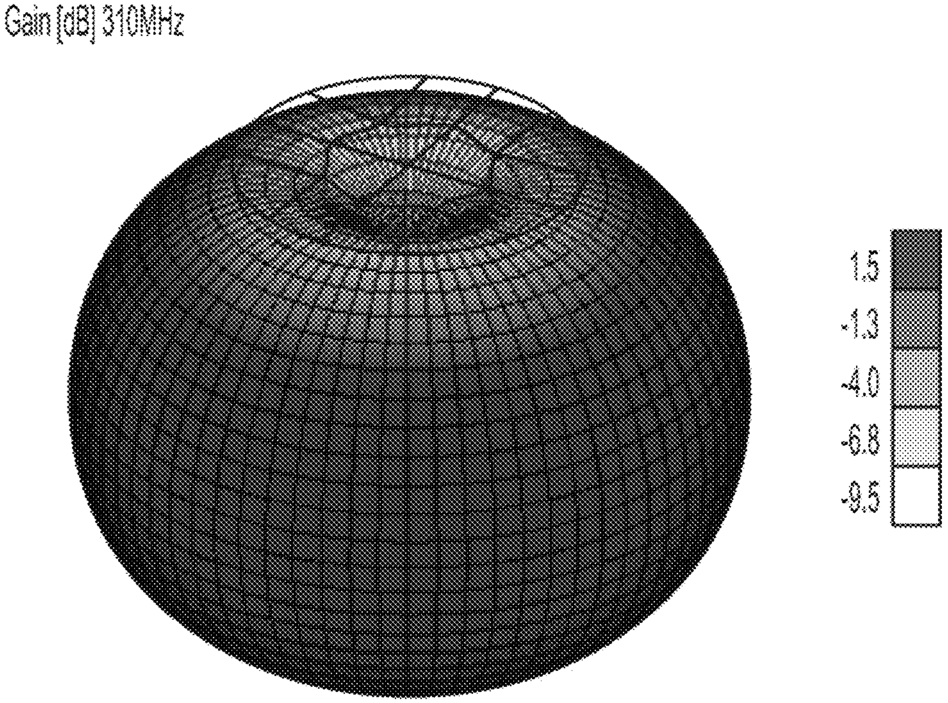
FIG. 6C depicts the gain pattern in dBi of the simulated folded monopole at 310 MHz, according to an example.
Figure 6D:
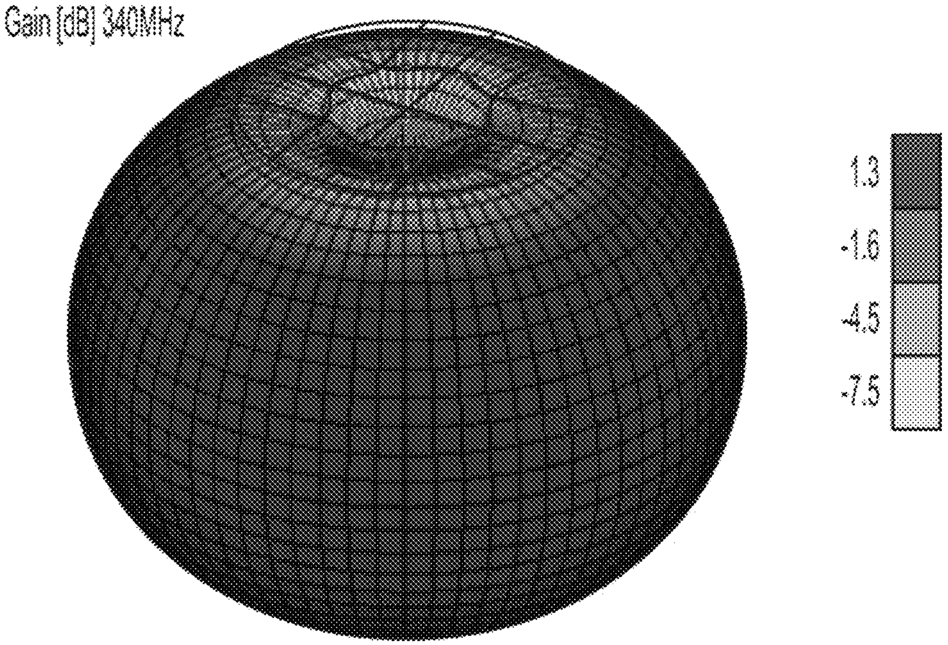
FIG. 6D depicts the gain pattern in dBi of the simulated folded monopole at 340 MHz, according to an example.

FIG. 4 depicts a simulated model of a folded monopole antenna 102 (in this figure, the reference numerals are designated with an apostrophe to emphasize that the parts of FIG. 4 are simulations of the parts of antenna array 100 of FIG. 1) The upper element feedline is modeled as an unconnected wire because, pursuant to the discussion above, the propagating mode within the parasitic arm is that of an open circuit at the upper entry end. In this model, simulated folded monopole antenna 102' comprises simulated driven arm 104', simulated parasitic arm 106', and simulated shorting element (modeled here as a thin wire) 116'. Simulated folded monopole antenna 104' is disposed between simulated upper ground plane 120' and simulated lower ground plane 118'. Any upper or lower elements are omitted, as such elements are unlikely to significantly affect performance. Also, performance should be consistent for all lower elements, certainly if the elements are appropriately scaled. The monopole height is set at 0.245 wavelengths of the simulated drive signal (chosen to be of frequency 300 MHz for illustration), and the height to radius ratio of the driven arm is 10. Thus, the monopole is "fat," and is modeled as a cylinder without resorting to the approximate "thin wire" model. The parasitic arm 106' radius is 0.4 that of the driven arm 104' and the separation of the centers of the arms is 1.5 times the radius of the driven arm 104'. The corresponding impedance transformation ratio is 2. FIGS. 5A and 5B depict the return loss of simulated folded monopole antenna 102', FIG. 5 as a 50 Ohm normalized Smith Chart and FIG. 5B as a plot of return loss ($S_{1,1}$) across frequency. As indicated by FIG. 5B, the 10 dB return loss bandwidth is 17.7% for a center frequency of 283 MHz. FIG. 6 shows the gain patterns in dBi at 250 MHz, 280 MHz, 310 MHz, and 340 MHz. As shown, the antenna is suitably omnidirectional across multiple frequencies.

Figure 7:
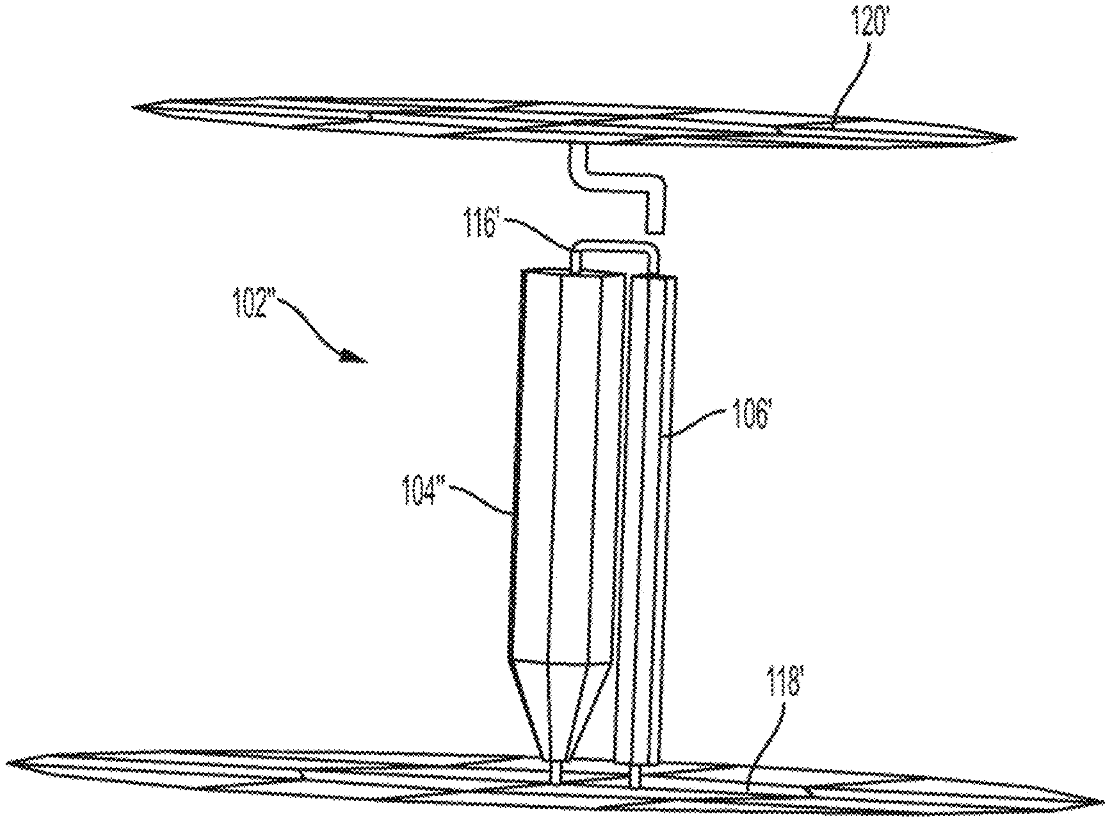
FIG. 7 depicts a perspective view of a simulation of a folded monopole antenna with a tapered feed region, according to an example.
Figure 8A:
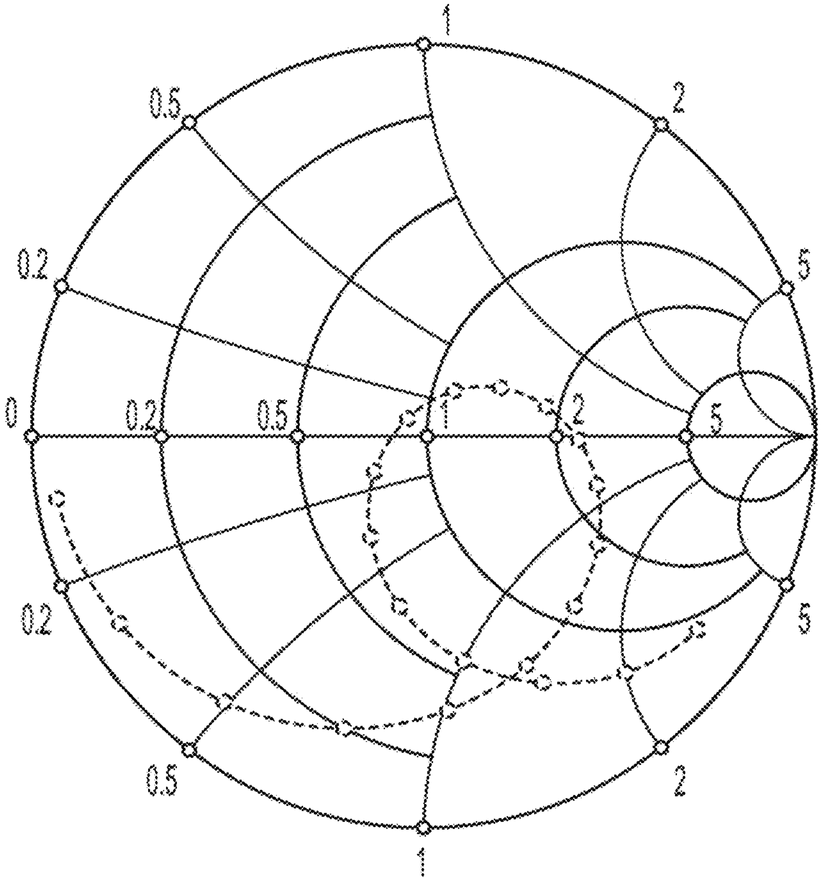
FIG. 8A depicts a 50 Ohm normalized Smith Chart of the return loss of the simulated folded monopole antenna with tapered feed region, according to an example.
Figure 8B:
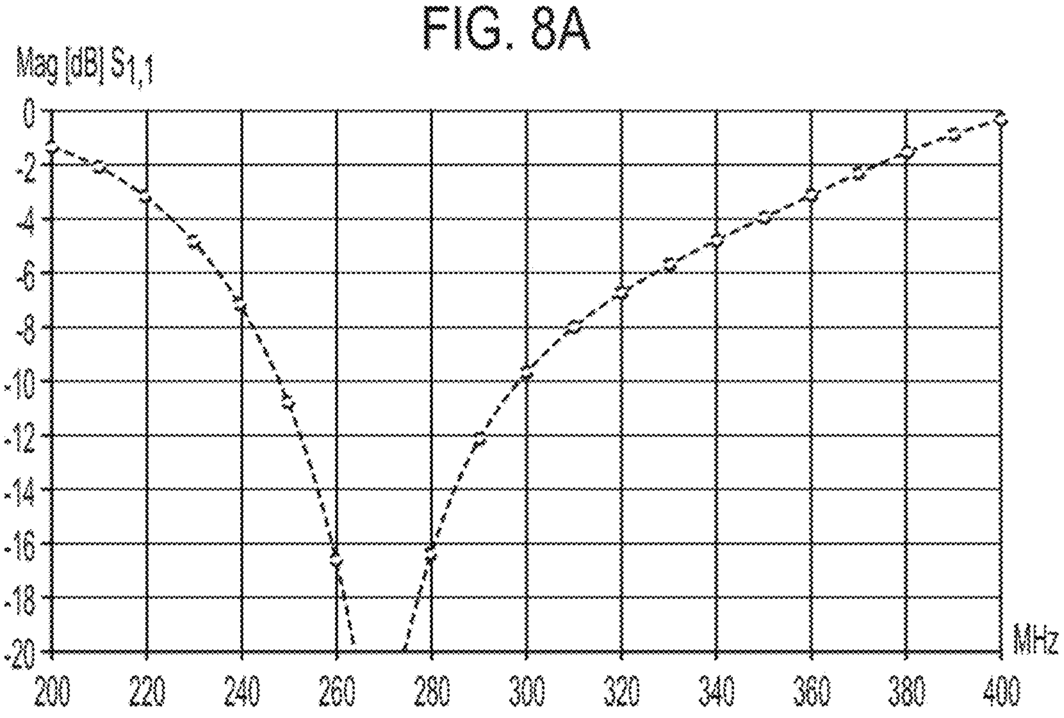
FIG. 8B depicts a plot showing return loss of the simulated monopole antenna with tapered feed region across frequency, according to an example.

FIG. 7 shows the simulated model of FIG. 6, modified by tapering the feed region of the driven arm 104" (FIG. 7 is otherwise the simulated folded monopole antenna 102'). As a result of the tapering, as shown in FIGS. 8A and 8B, the bandwidth increases to 18.6%, due to a reduction in feed region capacitance. Accordingly, the folded monopole antennas 102-102-3 of FIGS. 1-3 can be tapered in the feed region of the driven arm 104, where the driven arm 104 receives the respective feedline.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. An antenna array, comprising:

a first ground plane;

a second ground plane disposed below the first ground plane;

a first folded monopole antenna disposed between the first ground plane and the second ground plane, the first folded monopole antenna comprising a first driven arm, a first parasitic arm, and a first short connecting the first driven arm to the first parasitic arm;

an antenna disposed above the first ground plane; and a first feedline in electrical communication with the antenna such that an electrical signal input to the first feedline drives the antenna, wherein the first feedline extends through a cavity formed within the first parasitic arm of the first folded monopole antenna;

a third ground plane disposed below the second ground plane;

a second folded monopole antenna disposed between the second ground plane and the third ground plane, the second folded monopole antenna comprising a second driven arm, a second parasitic arm, a second short connecting the second driven arm to the second parasitic arm, and a second cavity formed within the second parasitic arm; and a second feedline is in electrical communication with the first folded monopole antenna such that a second electrical signal input to the second feedline drives the first folded monopole antenna, wherein the second feedline and the first feedline extend through the second cavity formed within the second parasitic arm.

2. The antenna array of claim 1, wherein the antenna is a dipole.

3. The antenna array of claim 1, wherein the first short is conductively attached to the first ground plane.

4. The antenna array of claim 1, wherein the first short is separated from the first ground plane by a distance.

5. The antenna array of claim 1, wherein the first feedline enters the first parasitic arm through an aperture in the first parasitic arm of the first folded monopole antenna, wherein the aperture is at least partly filled with a conductive material.

6. The antenna array of claim 5, wherein the conductive material is a conductive putty.

7. The antenna array of claim 1, wherein the first feedline is a coaxial cable.

8. The antenna array of claim 1, wherein the first driven arm is tapered at a receiving end, the receiving end receiving a second feedline.

9. The antenna array of claim 1, wherein the second driven arm is tapered at a receiving end, the receiving end receiving a third feedline.

* * * * *